United States Patent [19]

Breivik

[11] Patent Number: 5,797,694
[45] Date of Patent: Aug. 25, 1998

[54] ADJUSTABLE RIDGE CONNECTOR

[75] Inventor: Arne Norris Breivik, Orlando, Fla.

[73] Assignee: Alpine Engineered Products, Inc., Pompano Beach, Fla.

[21] Appl. No.: 624,924

[22] Filed: Mar. 29, 1996

[51] Int. Cl.$^6$ .................................................. F16B 7/08
[52] U.S. Cl. ........................ 403/231; 52/289; 52/702; 503/4; 503/237; 503/403
[58] Field of Search ........................ 52/289, 702, 712, 52/714; 403/3, 4, 231, 233, 234, 237, 403

[56] References Cited

U.S. PATENT DOCUMENTS

| | | | |
|---|---|---|---|
| 2,084,758 | 6/1937 | Anderson | 403/231 |
| 4,230,416 | 10/1980 | Gilb . | |
| 4,423,977 | 1/1984 | Gilb | 52/702 X |
| 4,498,801 | 2/1985 | Gilb | 403/4 X |
| 4,560,301 | 12/1985 | Gilb | 403/403 X |
| 5,004,369 | 4/1991 | Young | 403/403 X |
| 5,150,982 | 9/1992 | Gilb | 403/233 X |
| 5,217,317 | 6/1993 | Young . | |
| 5,230,198 | 7/1993 | Callies | 52/702 |
| 5,380,116 | 1/1995 | Colonias | 403/231 X |
| 5,457,928 | 10/1995 | Sahnazarian | 52/702 |

OTHER PUBLICATIONS

"Kant–Sag Lumber Connectors", United Steel Products Company, 1994, pp. 37–40.

"Connectors For Wood Construction Product & Instruction Manual", Simpson Strong–Tie Company, Inc., Jan. 1, 1995.

"Semco Metal Connectors 1995–1996", Southeastern Metals Manufacturing Company, Inc., 1995.

*Primary Examiner*—Kenneth J. Dorner
*Assistant Examiner*—Andrea Chop
*Attorney, Agent, or Firm*—Crutsinger & Booth

[57] ABSTRACT

An adjustable hanging bracket having an elongated spine with a longitudinal axis. The spine has a first portion and a second portion. First and second opposed ears extend from the first portion of the spine in a direction transverse to the axis. Each of the ears have distal ends. First and second opposed flanges extend from the spine in a direction transverse to the longitudinal axis and are adjacent to the first and second ears. The first and second flanges form an arcuate taper towards the second portion of the spine. A first and a second seat tab extend longitudinally from the second portion of the spine in a direction transverse to the longitudinal axis and forman acute angle with respect to the longitudinal axis of the spine. Each of the seat tabs have distal ends. The flanges define a plurality of fastener openings. The openings are aligned about a plurality of vertically spaced axes. At least two sets of openings are formed by the plurality of openings, each set is distinguishable from the other for designating either skewed or non-skewed configurations.

3 Claims, 5 Drawing Sheets

5,797,694

1

ADJUSTABLE RIDGE CONNECTOR

TECHNICAL FIELD

The invention relates to an adjustable ridge connector for use in building construction. More particularly, the invention relates to an adjustable ridge connector for hanging joists from a ridgeboard in either a skewed configuration, a sloped configuration, or a combination of both configurations.

BACKGROUND OF THE INVENTION

In wood frame construction where supported members such as a joist or a rafter are supported by a ridgeboard, either a compound cut is typically required in the end of the supported member or custom fabricated hangers must be used for the slope and skew angles involved. Similar positioning problems exist in other frame construction such as floors where floor joists are typically supported by girders.

The problem of attaching sloped or skewed joists to ridgeboards has been addressed by others. For example, U.S. Pat. No. 4,423,977, issued to Tyrell T. Gilb, discloses a single element slope-and-skew hangar for attaching a supported member to a supporting member. Hanger side-support members are bent along bend lines to maintain both hanger members in contact with the a ridgeboard while supporting a rafter skewed relative to the ridgeboard.

Presently available joist hangers have limited skew ranges due to the requirement that both hanger members be secured to the ridgeboard. Furthermore, hanger seat creases that support the rafter are formed by cut-outs that intrude into the hanger's spine, limiting the overall effective support area of the hanger.

With respect to skew angles, spacers or other measures must be used to obtain the desired skew angle and support when both hangar members cannot maintain direct contact with the ridgeboard. Preparing a spacer requires determining the size of the spacer, the depth of the spacer. Then a framing contractor must come down from the roof frame to make the spacer and then climb back up to the roof to install the spacer. This delay requires additional time and as a result increases labor costs.

A need exists for a slope-skew joist hanger which has a greater skew range without the necessity for specialized modification for use.

SUMMARY OF THE INVENTION

An adjustable hanging bracket having an elongated spine with a longitudinal axis. The spine has a first portion and a second portion. First and second opposed ears extend longitudinally from the first portion of the spine in a direction transverse to the axis. Each of the ears have distal ends. First and second opposed flanges extend from the spine in a direction transverse to the longitudinal axis and are adjacent to the first and second ears. The first and second flanges form an arcuate taper towards the second portion of the spine. A first and a second seat tab extend from the second portion of the spine in a direction transverse to the longitudinal axis and form an acute angle with respect to the longitudinal axis of the spine. Each of the seat tabs have distal ends. The flanges define a plurality of fastener openings. The openings are aligned about a plurality of vertically spaced axes. At least two sets of openings are formed by the plurality of openings, each set is distinguishable from the other for designating either skewed or non-skewed configurations.

In another aspect of the invention, a method for installing a joist to a ridgeboard with a hanger bracket is disclosed. The hanger bracker is mounted by securing the first flange to the ridgeboard, positioning the joist in a skewed relation with the ridgeboard between the first flange and the second flange of the hanger bracket, deforming the second flange to a position adjacent the joist, and securing the second flange to the joist.

BRIEF DESCRIPTION OF THE DRAWING

The accompanying drawing is incorporated into and forms a part of the specification to illustrate several examples of the present invention. The figures of the drawing together with the description serve to explain the principles of the invention. The drawing is only for the purpose of illustrating preferred and alternative examples of how the invention can be made and used and is not to be construed as limiting the invention to only the illustrated and described examples. The various advantages and features of the present invention will be apparent from a consideration of the drawing in which.

DESCRIPTION OF A PREFERRED EMBODIMENT

Figure 1:
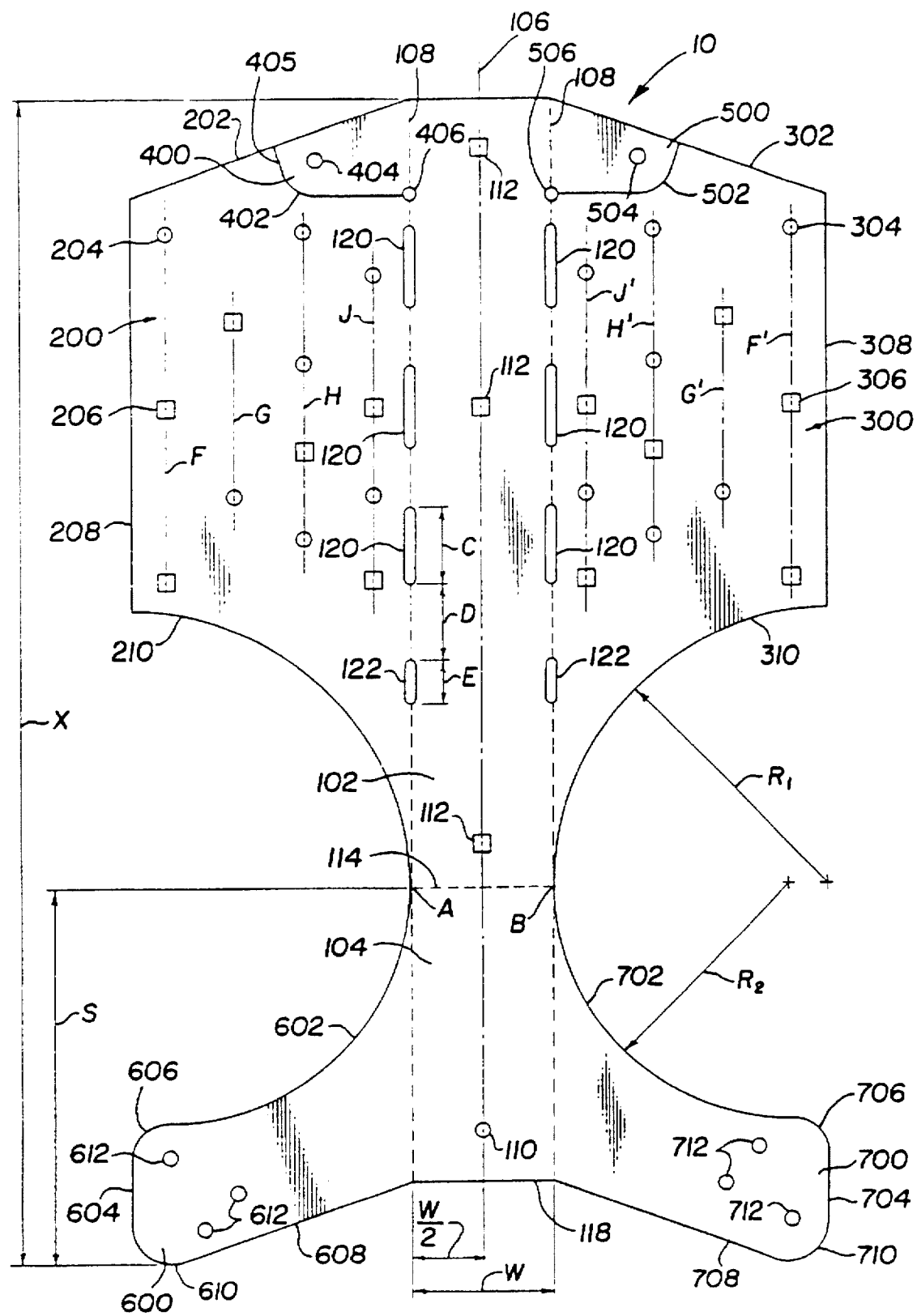
FIG. 1 is a front plan view of a slope or skew hanger.

The present invention will be described by referring to examples of how the invention can be made and used. Like reference characters are used throughout the several views of the drawing to indicate like or corresponding parts. The structure comprising the hanger bracket of the present invention utilizes an inventive concept to hang rafters or joists either in a slope orientation, a skewed orientation, or a combination sloped-skewed orientation.

Referring to FIG. 1, a skew-slope hanger bracket, generally designated by the numeral 10, is shown. Hanger bracket 10 has a spine 100 with a first portion 102 and a second portion 104. First and second flanges 200 and 300 extend from either side of spine-first portion 102 in wing-like fashion. Positioned above first and second flanges 200 and 300 are first and second ears 400 and 500, respectively. First and second seat tabs 600 and 700 extend from either side of spine-second portion 104.

As illustrated in FIG. 1, hanger bracket 10 is symmetrically oriented about longitudinal axis 106. It is preferred that both halves of hangar bracket 10 be mirror images containing equivalent elements. For convenience, the correlating elements are numbered with three-digit numbers beginning in the 100s. For example, the first flange is generally designated 200 and second flange is generally designated 300. The remaining two digits of these numbers indicate like parts between the flanges. But it should be noted that slight variations in the relational dimensions between the symmetrical portions can be incorporated with similar results.

Spine 100 is centered about longitudinal axis 106 and has a width W sufficient to accept a rafter board. Spine 100 also has a length X sufficient to accept the end of a rafter board. Defined in spine 100 are mounting openings 112, which are substantially square, and mounting opening 110 which is substantially circular. Mounting openings 110 and 112 are aligned along longitudinal axis 106. It should be noted that various shapes can be used for openings 110 and 112.

As illustrated in FIG. 1, first ear 400 is separated from first flange 200 by cutline 402 extending through hanger bracket 10 from shoulder 202 to opening 406. Defined in first ear 400 is fastener opening 404 near distal end 405. Shoulder 202 slopes downward from spine 100 at bend line 108, which is set out in dashed lines, to side edge 208. The slope, or pitch, of shoulder 202 is about 3/1 forming an obtuse angle with axis 106. Pitch, as used herein, is the ratio of longitudinal distance to vertical rise.

Side edge 208 is substantially vertical and extends to first arcuate edge 210 which extends past distal end 405 of ear 400. First arcuate edge forms a quarter-circle that extends from side edge 208 to tangentially-intersect bend axis 108 at point A. Seat bend axis 114, shown as a dashed line, extends from point A to point B. Second arcuate edge 602 continues from point A to first seat tab edge 604 through first rounded edge 606 forming a continuous semicircular edge from seat tab 600 to flange 200.

First curved edge 210 has a radial dimension R1 measured from first point of curvature P1. For the embodiment disclosed, radial dimension R1 is about three inches (7.62 cm). Second curved edge 602 has a radial dimension R2 measured from second point of curvature P2. Radial dimension R2 is about two-and-one-half inches (6.35 cm). These curves reduce a local stress concentration factor along the peripheral of these arcs when a load is exerting a generally downward force against seat-bend axis 114. It should be noted that radii R1 and R2 can be varied accordingly to accommodate different sized joists or rafters.

Ramped edge 608 extends from first seat tab edge 604 through second rounded edge 610. Ramped edge 608 intercepts second end 118 of spine 100 at bend axis 108. Ramped edge 608 can vary according to different rafter or joist sides and associated slopes, or pitches, used in construction. For the embodiment shown, ramped edge 608 has a slope, or pitch, of about 3/1, forming an acute angle with respect to longitudinal axis 106.

A first plurality, or set, of fastener openings 204 are defined in flange 200. Fastener openings 204 are substantially circular. A second plurality, or set, of fastener openings 206 are also defined in flange 200. Fastener openings 206 are substantially square. Fastener openings 204 and 206 have diameters and widths, respectively, of a size sufficient to accept suitable fasteners such as nails or the like. An example of suitable fasteners are size-d common nails having a diameter of about 0.148 inch. The first and second plurality of fastener openings 204 and 206 are arranged on four vertically spaced axes designated by dashed lines F, G, H and J, respectively. Column J is located near bend line 108 to accommodate downward shear forces caused by the weight of joist S against seat bend axis 114. The remaining columns are spaced approximately uniformly apart to distribute stress loads across the fastener openings in flanges 200 and 300, respectively, when joist S is suspended by hanger bracket 10. Fastener openings 204 and 206 are also spaced apart sufficient to limit stresses which can cause tension failure or buckling failure in the steel or splitting a rafter or ridgeboard made of wood or a wood product. The wooden material would rise above the flanges 200 and 300. The openings are also spaced vertically and along the columns F, G, H and J to distribute a rafter load across a ridgeboard's grain pattern. Because a ridgeboard's grain patterns generally run longitudinally, the openings are offset to distribute a joist load over the ridgeboard's grain patten.

Still referring to FIG. 1, a plurality of elongated slots 120 are defined along bend axis 108. Slots 120 facilitate manual bending of flanges 200 and 300 along bend axis 108 in the field. Slots 120 have a length C. In the embodiment shown, length C is about 0.875 inches (2.22 cm) long and about 0.125 inches (0.32 cm) wide. The distance D between the slots is about 0.625 inches (1.59 cm). Second slot 122 has a length E. Length E in this embodiment is about 0.5 inches (1.27 cm) long. Again, these dimensions can vary accordingly to accommodate different sized joists or ridgeboards.

Hanger bracket is stamped or cut from a durable load-supporting material. An example of such a material is 18-gauge galvanized steel. Hanger bracket 10 can be made from heavier gauge galvanized steel such as 16-gauge steel as needed.

Figure 2:
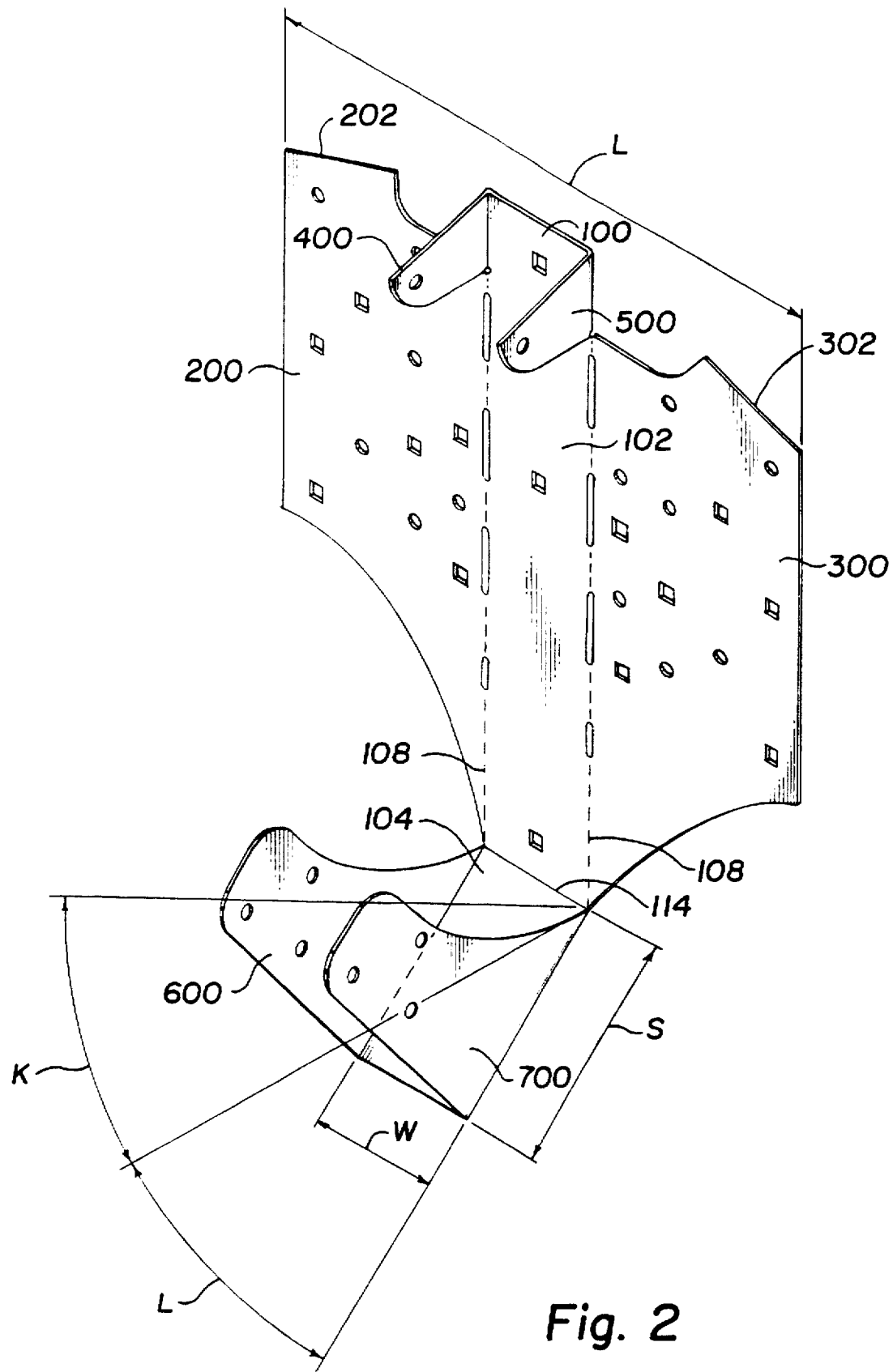
FIG. 2 is a perspective view of the invention.

Referring to FIG. 2, a perspective view of hanger bracket 10 is shown. First ear 400 and second ear 500 are in a substantially orthogonal relation with first portion 102 of spine 100. Similarly, first and second seat tabs 600 and 700 are in a substantially orthogonal relation with second portion 104 of spine 100. As illustrated, first portion 102 and second portion 104 are positionable with respect to each other through seat bend axis 114. Radial curves K and L indicate the range of pitch of the second portion 104 with respect to the first portion 102. The joist pitch values that hanger bracket 10 can accommodate is from about 3/12 up to about 14/12 down, indicated by radial curves K and L, respectively. It should be noted that varying pitches can be obtained by varying the dimensions of the embodiment shown without deviating from spirit and scope of the invention.

Figure 4:
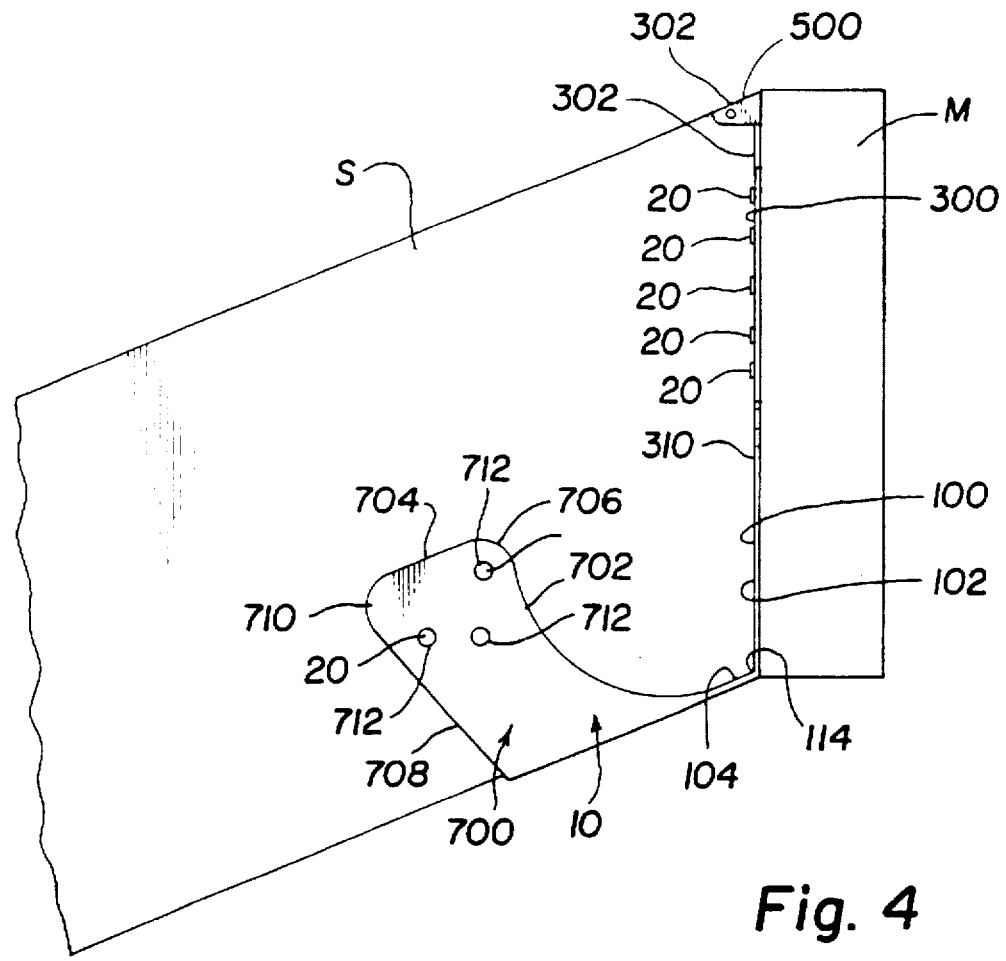
FIG. 4 is a side plan view of the invention installed in a sloped configuration.

Referring to FIG. 4, a side plan view of hanger bracket 10 is shown mounted on ridgeboard M to support the joist S in a sloped orthogonal orientation. Fasteners 20 are inserted through fastener openings 712 in seat tab 700. On the other side of joist S, fasteners 20 are inserted through fastener openings 612 in seat tab 600. It should be noted that hanger bracket 10 can be used when joist S is substantially horizontal-a pitch of about zero.

Figure 3:
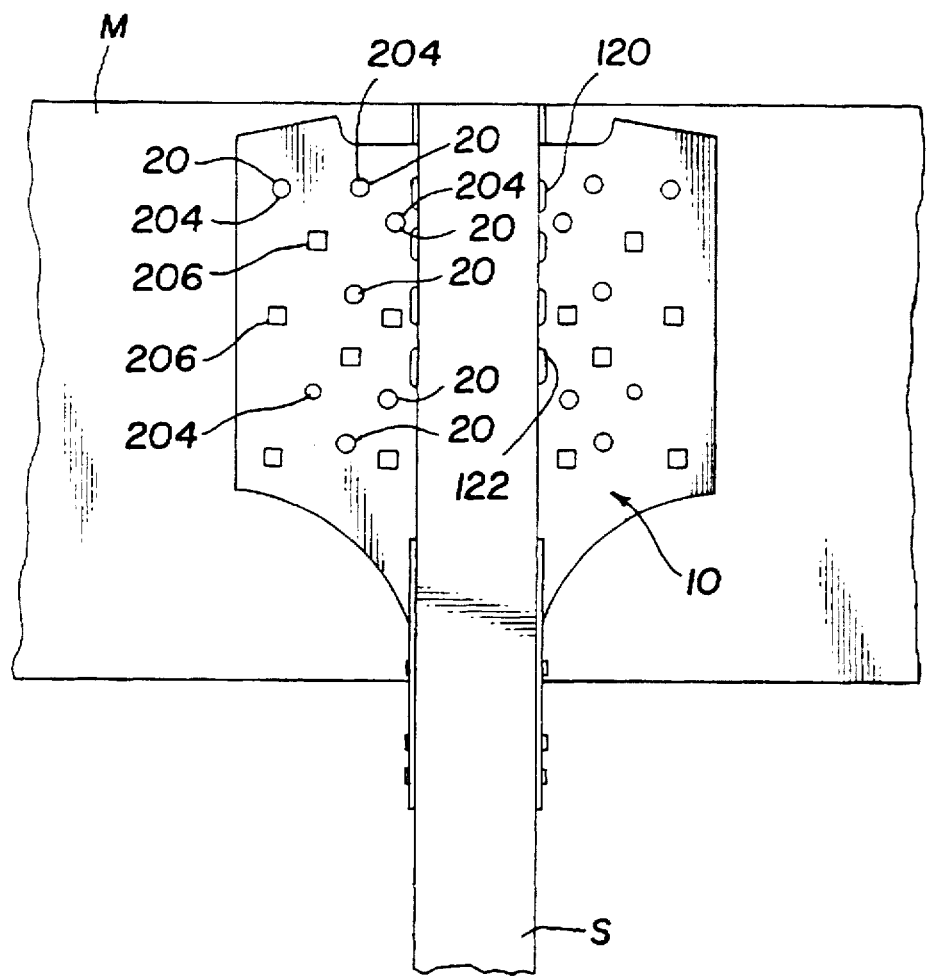
FIG. 3 is a front plan view of the invention installed in a sloped configuration.

Referring to FIG. 3, a front plan view of hanger bracket 10 is shown mounted on ridgeboard M to support the joist S in the sloped orthogonal orientation. Fastener openings 204 and 304 are shaped differently from fastener openings 206 and 306. For convenience, fastener openings 204 and 304 are circular-shaped and fastener openings 206 and 306 are rectangular-shaped. Other shapes or profiles can be used to distinguish the sets of openings to achieve the same objective. When hanger bracket 10 is used for orthogonal joist hanging, fasteners are inserted into only fastener openings 110, 204 and 304. Ears 400 and 500-positioned at the uppermost end of spine 100 adjacent flanges 200 and 300, respectively-are fastened to joist S with fasteners 20 driven through holes 404 and 504. Ears 400 and 500 provide lateral support to the compression flange, or top surface, of the joist so that it does not tip out of the support seat when the joist S is loaded. The support seat is formed by spine second portion 104 and seat tabs 600 and 700, respectively. 5 Lateral support of the compression members such as rafters, joists, beams, and the like as required by various building codes.

Figure 5:
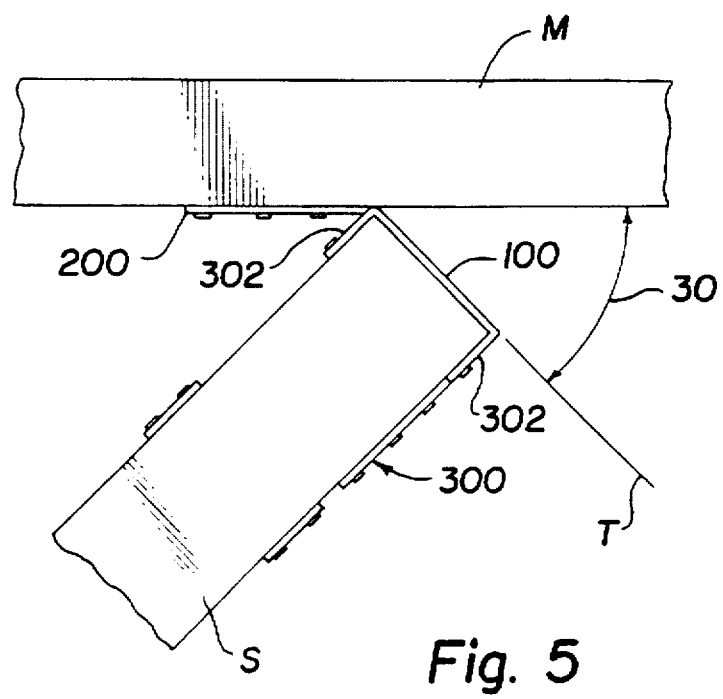
FIG. 5 is a top plan view of the invention installed in a skewed and sloped configuration.
Figure 6:
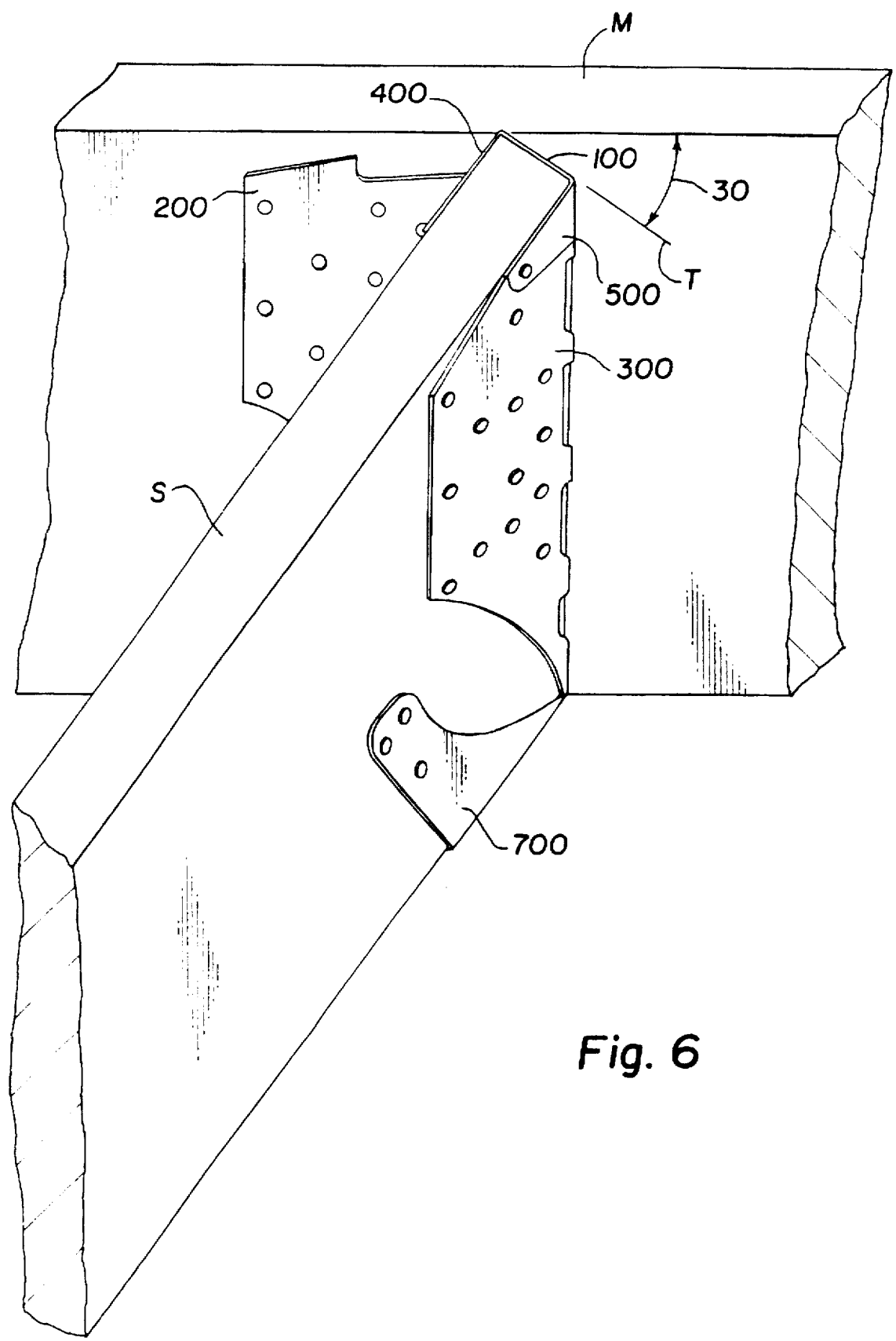
FIG. 6 is a perspective view of the invention installed in a skewed and sloped configuration.

Referring now to FIGS. 5 and 6, the hanger bracket 10 is shown in a sloped-joist configuration with a skew angle 30 extending between reference line T and the surface of ridgeboard M. Openings 206 and 306 are arranged on flanges 200 and 300, respectively, to counter a torsional moment about spine 100 caused by the eccentric attachment of hanging bracket 10 to ridgeboard M and joist S. When hanger bracket 10 is used for skewed-angle joist hanging, then all fastener openings in spine 100 and in flanges 200 and 300 have fasteners 20 inserted to hang the joist at a skewed angle, as shown in FIGS. 5 and 6. An advantage of hanging bracket 10 is the omission of a flange conventionally attached to ridgeboard M which limit the magnitude of the skew angle and therefore the usefulness of such devices. Flange 300 also eliminates the need for spacer devices to lengthen the reach of flanges on conventional devices, thereby eliminating labor costs required to fabricate spacers. Unlike conventional devices, hanger bracket 10 can accommodate skew angles greater than 45-degrees. Some conventional devices have skew ranges to 30-degrees without spacers, and skew angles from 31-degrees to 45-degrees with spacers. It should be noted that with joists skewed in a direction opposite that shown in FIGS. 5 and 6, flange 300 is secured to the ridgeboard M and flange 200 to the Joint S.

The description and figures of the specific example above do not point out what an infringement would be, but are to provide at least one explanation of how to make and use the invention. Numerous modifications and variations of the preferred embodiments can be made without departing from the scope and spirit of the invention. Thus, the limits of the invention and the bounds of the patent protection are measured by and defined by the following claims:

Having described the invention, what is claimed is:

1. An adjustable hanging bracket comprising:

an elongated spine with a longitudinal axis, said spine having a first portion and a second portion;

first and second opposed ears extending from the first portion of said spine in a direction transverse to the longitudinal axis, each of said ears having distal ends;

first and second opposed flanges extending from said spine in a direction transverse to the longitudinal axis and adjacent to said first and second ears, said first and second flanges forming a side edge and forming an arcuate taper extending from said side edge towards the second portion of said spine;

a first and second seat tab extending from said second portion of said spine in a direction transverse to the longitudinal axis, each of said seat tabs having distal ends; and a first bending axis formed at the juncture of said first flange and said spine and a second bending axis formed at the juncture of said second flange and said spine, said first and second bending axes being substantially parallel to one another and to the longitudinal axis of the spine.

2. The adjustable hanging bracket as defined in claim 1, wherein:

said bending axes are defined by a plurality of aligned slots.

3. The adjustable hanging bracket as defined in claim 1, wherein:

said aligned slots are elongated.

\* \* \* \* \*

UNITED STATES PATENT AND TRADEMARK OFFICE
CERTIFICATE OF CORRECTION

PATENT NO. : 5,797,694

DATED : August 25, 1998

INVENTOR(S) : Arne Norris Breivik

Page 1 of 2

It is certified that error appears in the above-identified patent and that said Letters Patent is hereby corrected as shown below:

On the title page item [57],

In the Abstract, line 10, delete "longitudinally".

In the Abstract, line 12, delete "forman" and insert -- form an --.

Column 1, line 22, delete "hangar" and insert --hanger--.

Column 1, line 25, delete the word "a".

Column 1, lines 50 - 51, delete "longitudinally".

Column 1, line 52, after "the" (1st occurrence) insert -- longitudinal --.

Column 2, line 54, delete "hangar" and insert --hanger--.

Column 4, line 30, after "from" insert -- the --.

Column 4, line 57, after "respectively.", delete -- 5 --.

Column 4, line 59, delete "as" and insert -- is --.

UNITED STATES PATENT AND TRADEMARK OFFICE
CERTIFICATE OF CORRECTION

PATENT NO. : 5,797,694

DATED : August 25, 1998

INVENTOR(S) : Arne Norris Breivik

It is certified that error appears in the above-identified patent and that said Letters Patent is hereby corrected as shown below:

Column 5, line 6, delete "limit" and insert - - limits - -.

Column 5, line 17, delete "Joint" and insert - - joist - -.

Signed and Sealed this

Eighth Day of December, 1998

Attest:

BRUCE LEHMAN

Attesting Officer

Commissioner of Patents and Trademarks